US009684449B2

(12) United States Patent
Yang

(10) Patent No.: US 9,684,449 B2
(45) Date of Patent: Jun. 20, 2017

(54) CHARACTER INPUT USING MODERN REMOTE CONTROL

(71) Applicant: Yahoo! Inc., Sunnyvale, CA (US)

(72) Inventor: Hsi-Heng Sean Yang, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 272 days.

(21) Appl. No.: 14/511,684

(22) Filed: Oct. 10, 2014

(65) Prior Publication Data

US 2016/0103502 A1   Apr. 14, 2016

(51) Int. Cl.
*G06F 3/02* (2006.01)
*G06F 3/0489* (2013.01)
*G06F 3/023* (2006.01)

(52) U.S. Cl.
CPC .......... *G06F 3/0489* (2013.01); *G06F 3/0236* (2013.01); *G06F 3/02* (2013.01)

(58) Field of Classification Search
CPC .... G06F 3/0236; G06F 3/0489; G06F 3/0233; G06F 3/0219; G06F 3/0481; G06F 3/0482; G06F 3/04817; G06F 17/30061; G06F 17/30064; G06F 3/02; H04N 7/163; G10L 15/22

USPC .................. 340/12.23; 725/39; 248/E5.105; 715/708

See application file for complete search history.

(56) References Cited

U.S. PATENT DOCUMENTS

| 7,506,256 B2 * | 3/2009 | Baker | G06F 3/0481 704/1 |
| 2006/0218587 A1 * | 9/2006 | Kelts | G06F 3/0481 725/39 |

* cited by examiner

*Primary Examiner* — Ali Neyzari
(74) *Attorney, Agent, or Firm* — Martine Penilla Group, LLP

(57) ABSTRACT

Methods and system for generating a first set of selection options for presentation on a display screen of a television. Each first set selection option identifies a sub-set of symbols. The presentation provides a visual representation of spatial relationship between the first set of selection options and a first group of input options available on a physical remote control. A first user selection is received for the first group of input options. In response to receiving the first user selection, a second set of selection options corresponding to the first user selection, is generated for presentation as a visual representation of spatial relationship between the second set of selection options and a second group of input options available on the physical remote control. A second user selection is received for the input options from the second group and is interpreted to identify selection of one of the sub-set of symbols.

18 Claims, 10 Drawing Sheets

CHARACTER INPUT USING MODERN REMOTE CONTROL

BACKGROUND

Field of the Invention

The present invention relates to the field of television entertainment, and more particularly, to allow precise textual input using a remote control.

Description of the Related Art

With today's internet-enabled television sets as well as hundreds of channels being offered by content providers, being able to input text to initiate a search for interesting content is more important than ever. Currently, when users want to input text on a TV they usually do so by using an on-screen keyboard to search and select letters they want. This would require the users to navigate across an on-screen keyboard resulting in multiple button presses to select next alphabet/character. Additionally, a pause is required after selecting an alphabet to indicate the selection before a subsequent character selection can be initiated.

Another way the users input text is by using predictive input concept. According to this concept that is most commonly used in mobile devices, such as cell phones, the numbers in a number pad are mapped to alphabets, and as the user selects the number buttons containing the letters, words that are part of the system dictionary appear so that user can select one of the presented words. This concept requires the system to create and store a dictionary of words to enable the system to support word prediction. Oftentimes, such word predictions are not always accurate and may lead to waste of time. Furthermore, it also needs additional memory to store the dictionary and additional processing to parse and process the user selections to predict the words.

Alternately, users may pair user input devices, such as a keyboard (an input device that is normally not associated with a living room where the television is), to the television. This would require installing authentication software to authenticate the user as well as device pairing. While there are different alternatives, including the options described above, they often take user out of a leaned-back experience and focus them on doing tedious work to express what they are looking for, require extra expense and setup, and can often be imprecise.

It is in this context that the embodiments of the invention arise.

SUMMARY

Embodiments of the present invention describe methods and systems for enabling a user with the ability to input textual characters and other symbols using options provided in a modern remote control. The modern remote control include sets of buttons that are used for navigating through and selecting multimedia content available for viewing. Each set of button has a traditional purpose. The various embodiments discussed herein leverage the traditional functions and extend the functionality to allow the sets of buttons to work together to create a system where there is low learning curve to perform basic textual and other character/symbol input. A plurality of characters or symbols is reachable by just visiting two nodes or by visiting a node and a corresponding leaf of the node within a two-level ordered tree data structure.

Selection options that represent characters/symbols and their inter-relationships are presented in the two levels of the ordered tree data structure. Selecting a first option from the first level narrows the selection to a relatively small sub-set of characters/symbols by eliminating a majority of the available options. Selecting a second option from the second level allows a user to select a particular one of the symbols from the sub-set. An on-screen map is provided with the symbols displayed to mirror the way the options are laid out on a physical remote control to assist a user when providing user input. This mode of providing a map is especially useful for users who prefer to keep their eyes on the screen of a television while selecting the symbols. The system, according to various embodiments, allows use of commonly available buttons, such as number buttons and color-coded buttons, to select an available symbol/character with just two user input selection—a first user input for selecting an option from the first level and a second user input for selecting an option from the second level that maps to the actual symbol/character.

It should be appreciated that the present invention can be implemented in numerous ways, such as, methods, systems and an apparatus. Several inventive embodiments of the present invention are described below.

Accordingly, in one embodiment, a method is disclosed. The method includes generating a two-level, ordered tree data structure for receiving user input. The two-level tree structure includes a first level comprising a plurality of nodes and a second level that includes a plurality of leaves for each node in the first level. Each one of the nodes corresponds to a sub-set of symbols available for user selection and each leaf of particular node corresponds to a particular symbol within the sub-set. A first set of selection options corresponding to the nodes from the first level of the ordered tree data structure is presented on a display screen of a television. The presentation includes a visual representation of spatial relationship between the first level selection options and a first group of options available on a physical remote control. First user input is received identifying selection of a particular one of the selection options from the first level, wherein the first user input is provided using the first group of options on the physical remote control. In response to receiving the first user input, a second set of selection options is presented. The second set of selection options corresponds to the plurality of leaves from the second level. The leaves that are presented correspond to the particular selection option chosen from the first level. The presentation provides a visual representation of the spatial relationship between the selection options from the second level and a second group of options available on the physical remote control, wherein the second group of options is different from the first group of options. Second user input provided using the second group of options is received for the selection options presented from the second level. The second user input is interpreted to identify a particular one of the symbols from the sub-set.

In one embodiment, the first group of options is a number pad available on the physical remote control.

In one embodiment, the second group of options is a set of color-coded buttons available on the physical remote control.

In one embodiment, the first group of options and the second group of options are together used to identify an alphanumeric character.

In one embodiment, the symbols in the sub-set are related to actions to be taken at an interactive scene currently rendering on the display screen of the television. The first group of options and the second group of options together are used to identify a specific action to be taken.

In one embodiment, the visual representation presented for the first and the second selection options provide appropriate graphics representing the first and the second selection options.

In one embodiment, a method is provided. The method includes presenting a first set of selection options on a display screen of a television. Each of the selection options from the first set identifies a sub-set of symbols. The presentation provides a visual representation of spatial relationship between the first set of selection options and a first group of input options available on a physical remote control. A first user selection is received for the input options presented from the first group. In response to receiving the first user selection, a second set of selection options is presented. The second set of selection options corresponds to the first user selection. The presentation provides a visual representation of spatial relationship between the second set of selection options and a second group of input options available on the physical remote control, wherein the second group of input options is different from the first group of input options. A second user selection is received for the input options from the second group identifying selection of one of the sub-set of symbols.

In one embodiment, a two-level ordered tree data structure is generated. A first level of the tree data structure comprises a plurality of nodes corresponding to the first set of selection options and a second level of the tree data structure comprises a plurality of leaves associated with each of the plurality of nodes. The plurality of leaves correspond to the second set of selection options. Each second set of selection options, in turn, correspond to a symbol within the sub-set. The entered symbol or character (alphanumeric) is used in searching and selecting a multimedia content for viewing on a television.

The various embodiments of the invention provide an effective and efficient way of entering textual character and/or symbol with just two button presses/user input. The embodiments use low memory and processor utilization while providing more accurate character input to enable a more efficient search for multimedia content. Existing buttons within the physical remote control are used to input textual character/symbol, making for a more straight forward input mechanism. As a result, there is no need for special hardware or extended learning to get familiarized with the user input options. Traditional modes of searching and selecting characters continue to be supported. The layout of the keyboard of the physical remote control is the same as the button-only mode, allowing user to choose between casual and expert modes of operation with the opportunity to experience both, and seamlessly switch between the two modes.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
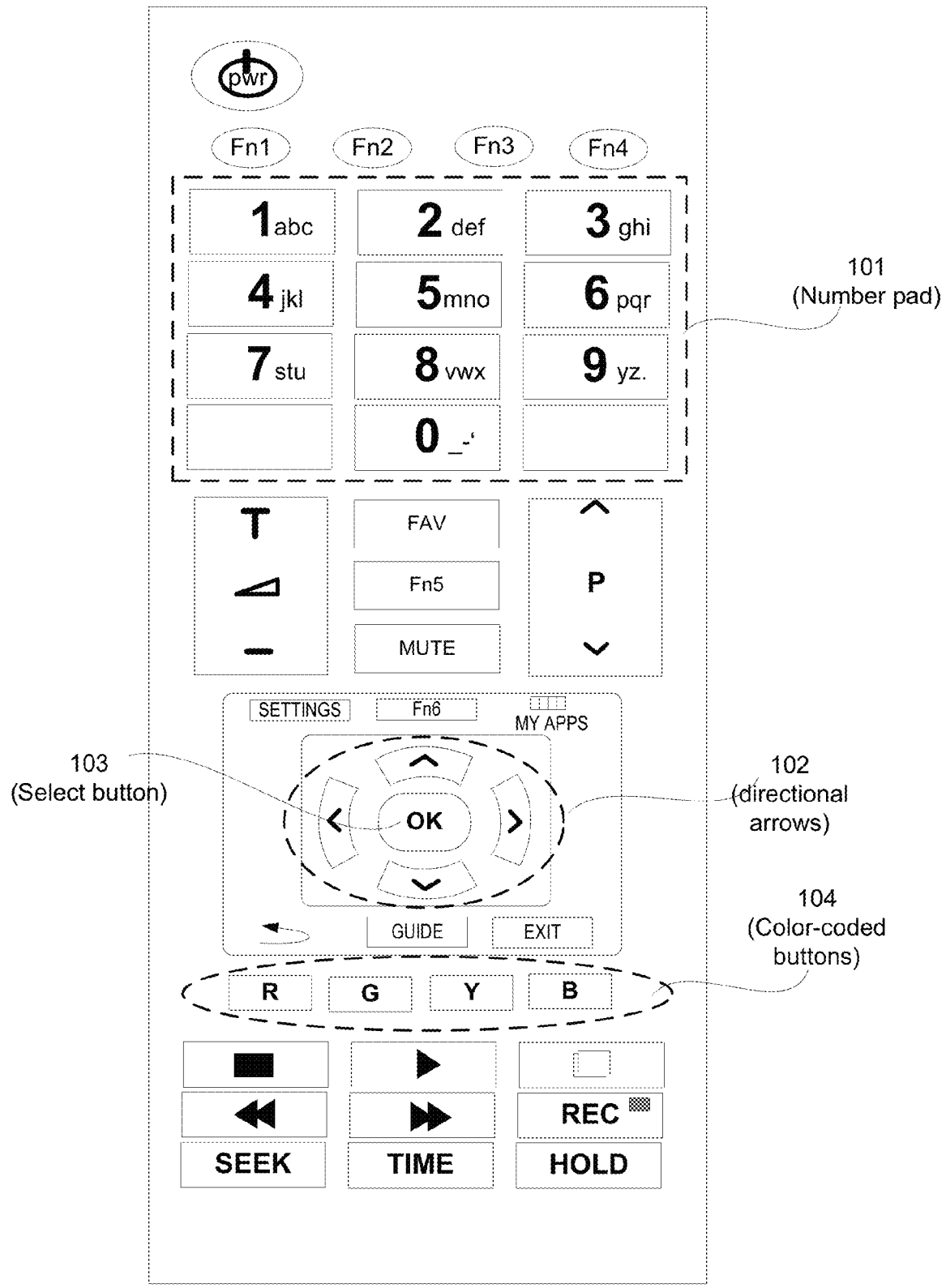
FIG. 1 illustrates a simplified rendering of a physical remote control that is used to provide user input for selecting a character, in one embodiment of the invention.

Broadly speaking, the embodiments of the present invention provide methods and systems for allowing a user to select characters/symbols using options available on a physical remote control. The input options used to for selecting characters/symbols are common buttons/options that are available on the physical remote control. A two-level ordered tree symbol map is generated with nodes on the first level and leaves for the nodes on the second level. Each node represents a sub-set of symbols and each leaf of a node represents a symbol within the respective sub-set. Selection options are defined for each level of the ordered tree using sets of buttons from the physical remote control, with each set of button being different. Visual representation of the sets of buttons for each of the first level and the second level are provided on a display screen of a television for user input. The visual representation presents the spatial relationship of each set of button with the corresponding input option layout of the physical remote control. User input at the first and the second levels is used to identify a specific one of the available characters/symbols. Thus, each character/symbol can be identified using just two user inputs (i.e., button press, button selection, key press, etc.).

The advantages of the systems and methods are many. The nodes and leaves of the nodes representing the symbols are arranged in a sequential order making it much easier to search. The visual representation is provided in the form of an on-screen map with the options for selecting nodes and leaves from the first and the second level, respectively, being laid out in the same way the two sets of buttons are laid out on the physical remote control. User selection at the first level identifies a sub-set of characters/symbols available for selection at the second level, greatly reducing the number of character/symbol selection for the second selection. Using the visual representation or using the sets of buttons, the user can provide his/her input selection to select the character/symbol. There is no need to maintain an online dictionary of select words or depend on any text prediction algorithm to determine the text that is being entered by a user. Further, there is no need to use special hardware, or pair a different device to provide the user input. The various embodiments allow use of an existing remote control that is already paired to the television to input the character/symbol. Use of an existing remote control translates to lower memory usage and low processor utilization. Since only two user inputs are needed to identify and select a character, the speed for entering characters is predictable and the character selection is definite. The original functionality of the remote control, i.e., the traditional hunt-and-select mode is still supported. However, in the current embodiments, the layout of the keyboard is same as button-only mode, allowing user to choose between casual and expert modes of operation with the opportunity to experience both, and seamlessly switch between the two modes. Further, speed for entering the characters can be enhanced by using both hands of a user—with one hand used to select from the first set of input options and the second hand used to select from the second set of input options.

With the brief overview, various embodiments of the invention will now be described in detail with reference to the figures. FIG. 1 illustrates a rendering of a physical remote control that can be used for providing user input to identify characters/symbols, in one embodiment. The remote control, as can be seen, includes standard sets of buttons/options for user selection. The standard sets of buttons include a number pad 101 with numbers that are distributed in a 3×4 pattern, a set of directional arrows 102 to help in navigation, a select button 103 (such as a "OK" button) to indicate selection, and a set of color-coded buttons/options 104. The color-coded buttons/options are traditionally used to provide context-sensitive input. It should be appreciated that the aforementioned sets of buttons are only few of the buttons on the remote control and that other buttons may also be included on the remote control to provide more specific functionality. It should be appreciated that the location and orientation of the various sets of buttons illustrated in FIG. 1 is exemplary and that other location and orientation may also be considered.

Figure 1A:
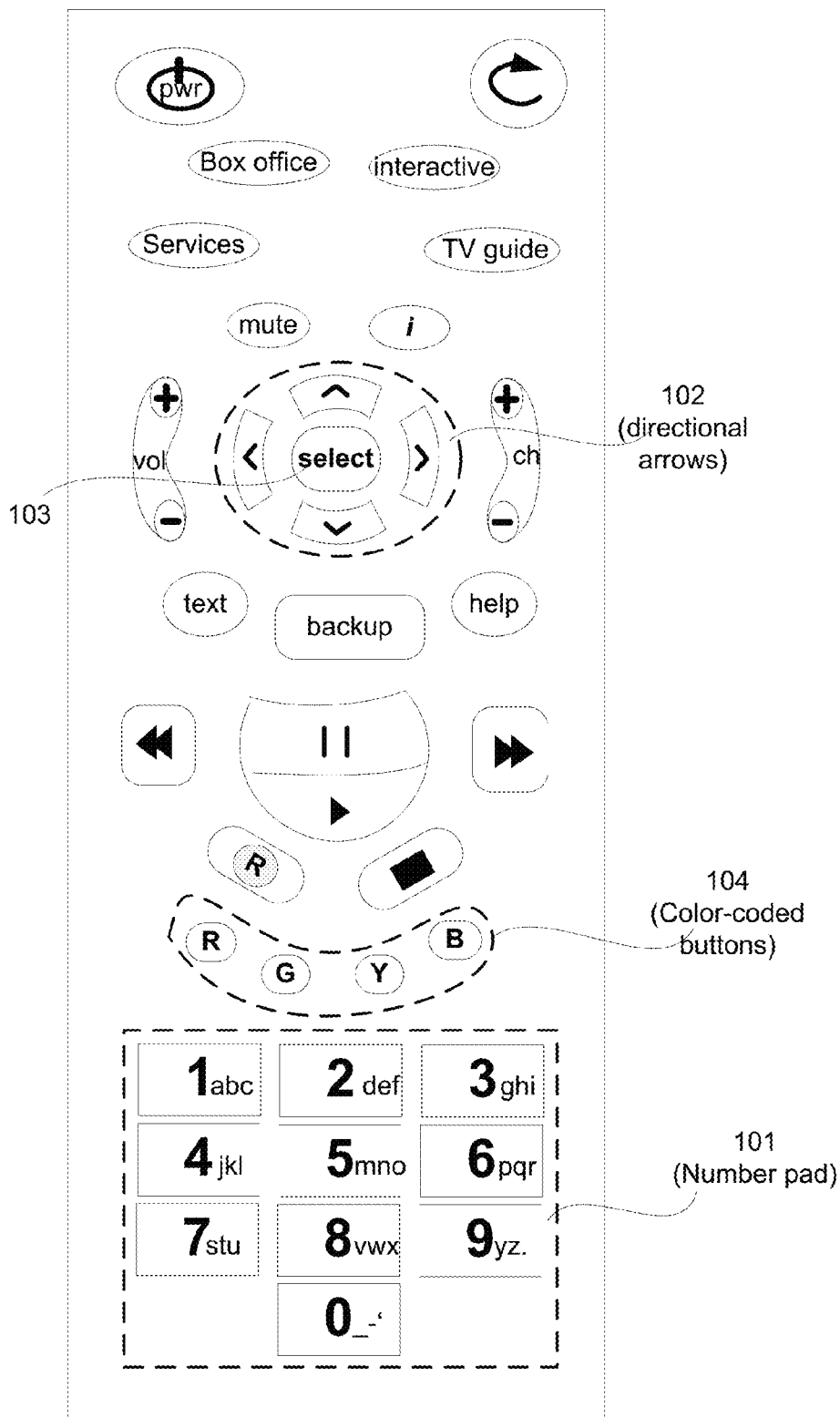
FIGS. 1A-1C illustrate alternate views of the physical remote control with different layout of buttons, in alternate embodiments of the invention.
Figure 1B:
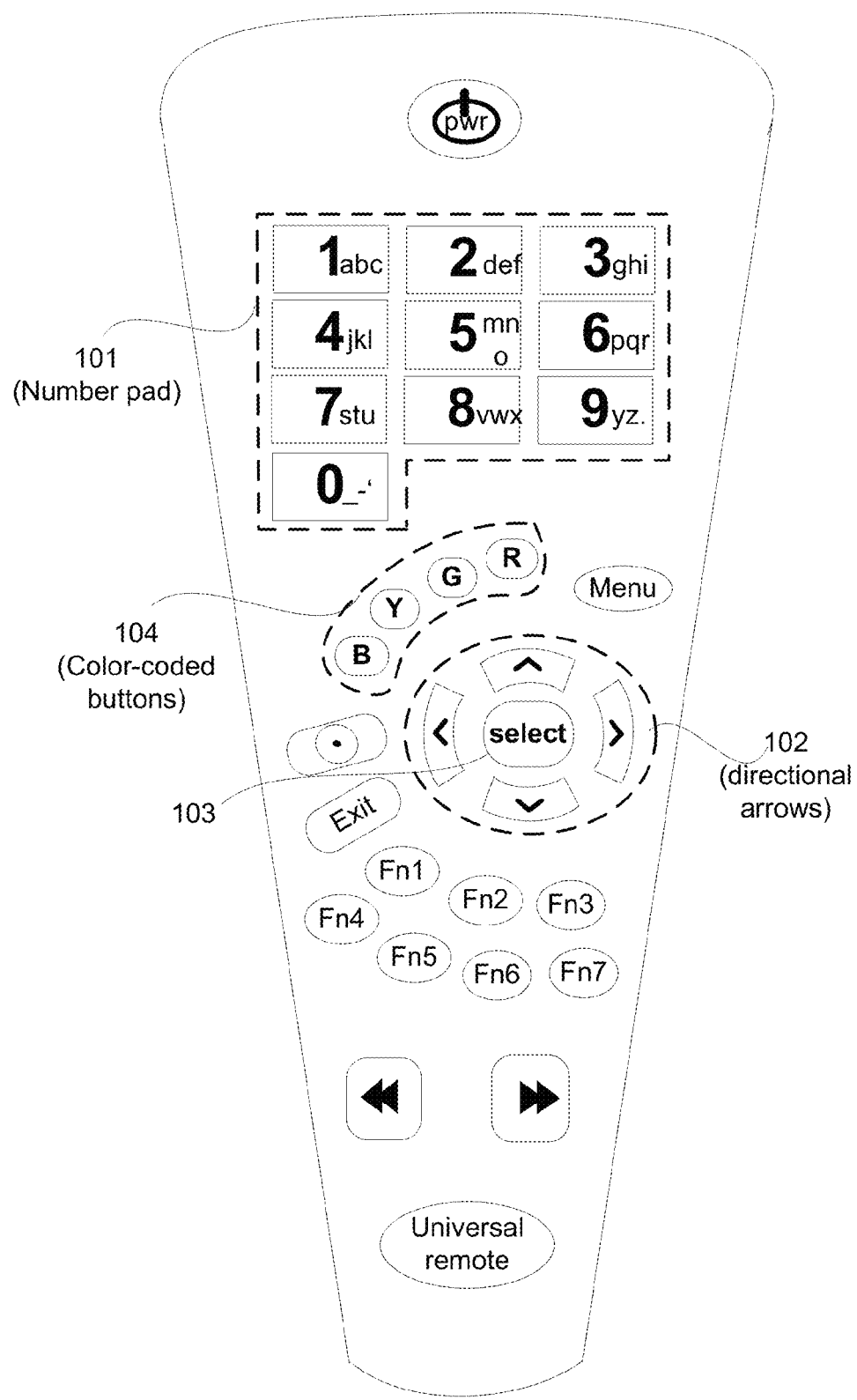
Figure 1C:
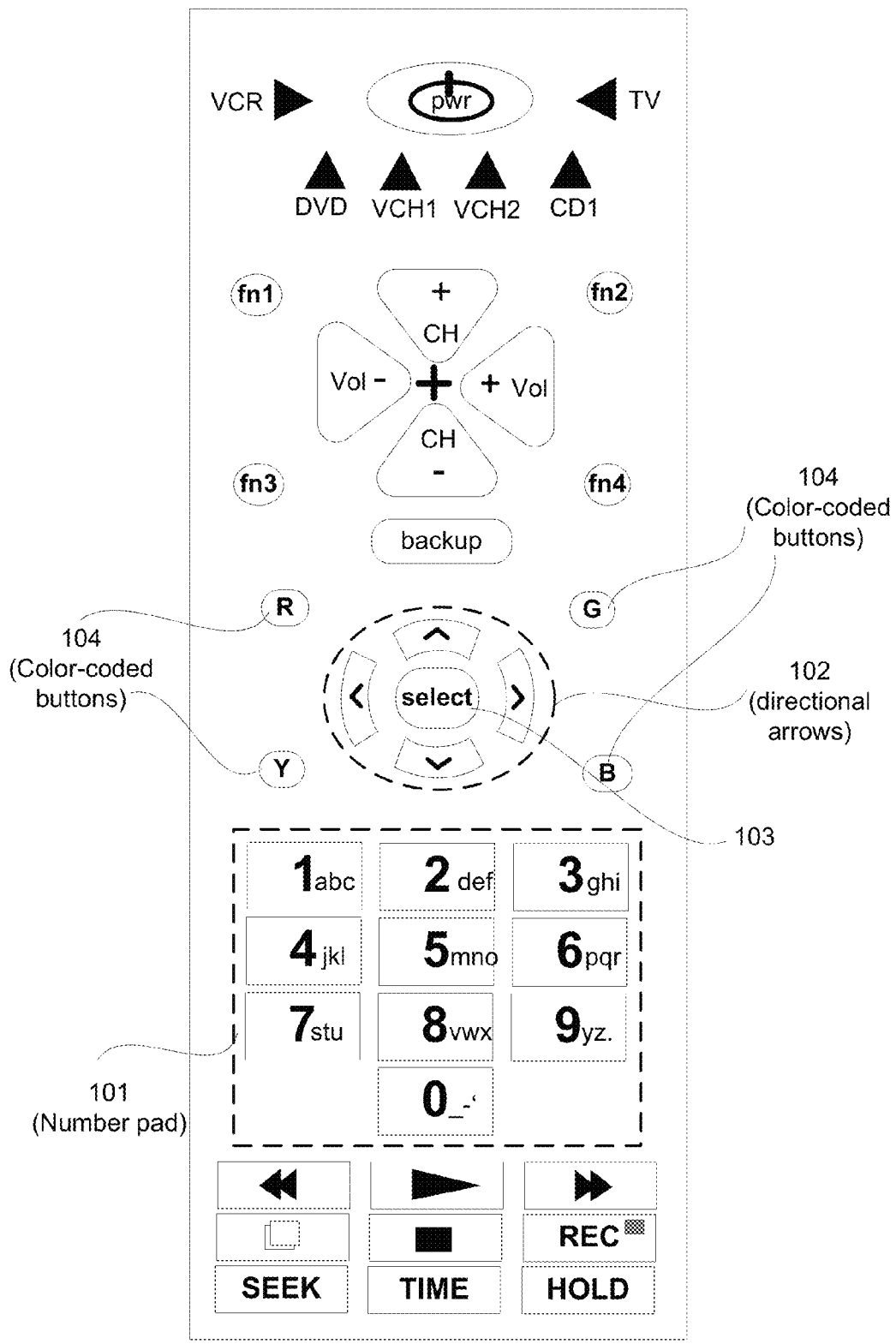

FIGS. 1A-1C illustrate different orientations and locations of the sets of buttons described in FIG. 1, in some embodiments. In FIG. 1A, the number pad 101 is located in the bottom, the color-coded buttons 104 are disposed immediately above the number 101 with the directional arrows 102 and the select button 103 disposed above the color-coded buttons 104.

FIG. 1B illustrates another embodiment wherein the number pad 101 is disposed on the top of the remote control, the color-coded buttons 104 are located below and to the side of the number pad 101. The orientation of the color-coded buttons 104 is different from the one illustrated in FIGS. 1 and 1A. The directional arrows 102 and the select button 103 are located below and to the side of the color-coded buttons 104. As can be seen from FIG. 1B, the orientation of the buttons may depend on the aesthetics of the design.

FIG. 1C illustrates yet another embodiment with the different sets of buttons disposed and oriented differently than the ones illustrated in FIGS. 1, 1A and 1B. The number pad 101 is located in the middle of the remote control, the directional arrows 102, select button 103 and the color-coded buttons 104 are located above the number pad 101. In this embodiment, the orientation of the color-coded buttons 104 are slightly different from the ones illustrated in FIGS. 1, 1A-1B. The color-coded buttons 104, in this embodiment are located at the corners of the directional arrows 102. It should, therefore, be understood that the location and orientation of the different sets of buttons used for providing user input varies with the design of the remote control and irrespective of the location and/or orientation, the sets of buttons 101-104 may be used for providing the necessary user input for identifying a character. In one embodiment, a visual representation of the remote may be provided on-screen of a television and the directional arrows 102 and select button 103 may be used to provide virtual user input by navigating over the on-screen remote. The current embodiments allow two modes of operation to co-exist complementing each other while providing the ability to seamlessly switch between the two modes. The operation mode switching between the two modes can be effectuated immediately by using different sets of buttons to provide user input. In one embodiment, the first mode is effectuated by using the number pad and color-coded buttons to provide precise character/symbol selection with minimal user input (i.e., two user input) while the second mode is effectuated using on-screen visual map, directional arrows and select navigation buttons to provide character/symbol selection using multi-press user input. The precise text input using the first mode adapts to user's mastery of remote control and finger dexterity and at the same time have low memory and processing requirements making it suitable for embedded devices.

Figure 2:
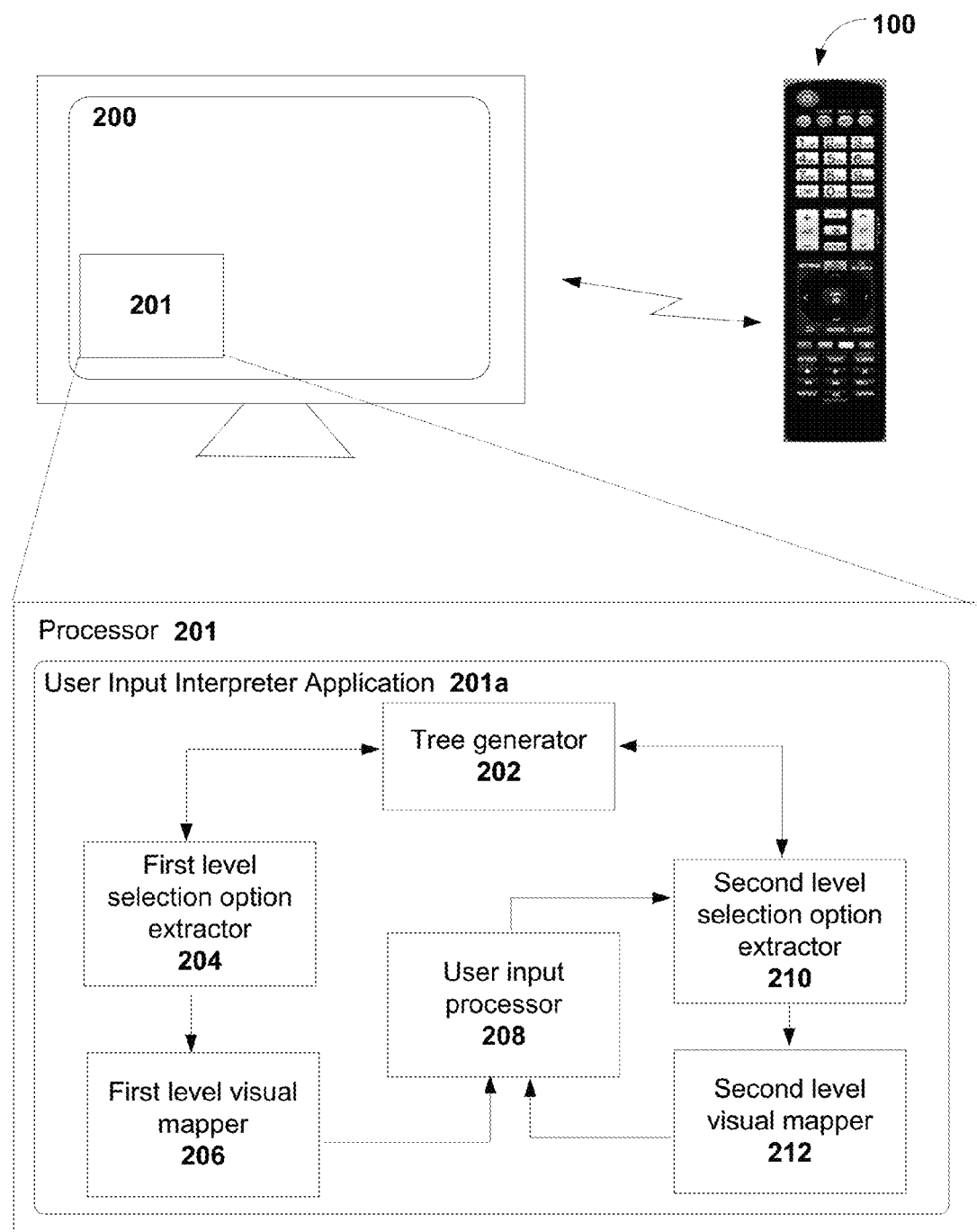
FIG. 2 illustrates a system used for interpreting the user inputs at the two levels to identify a character/symbol, in one embodiment of the invention.

FIG. 2 illustrates a system used for allowing precise user input of characters/symbols using the sets of buttons that are commonly available on a physical remote control, in one embodiment of the invention. A remote control 100 is communicatively paired to a television 200 to control selection of the multimedia content for viewing. In one embodiment, the communication pairing is wireless. A user may use the sets of buttons available on the remote control 100 to input characters/symbols that can be used to search and select multimedia content for viewing. As modern day televisions have the capability to connect to the internet and are equipped with processors, the televisions are capable of performing other tasks other than just viewing multimedia content provided by content providers. For instance, the television can be used to render content from applications, such as gaming applications, business applications, etc., that are available over the Internet or available on a computing device that is communicatively connected to the television. As a result, the content that is being rendered may be interactive content from any one of the applications or may be multimedia content that is retrieved from one of the content providers for viewing. The user input provided using the sets of buttons available on a physical remote control that is associated with the television may be used to interact with content rendering on the television or may be used to initiate search and selection of the multimedia content. In one embodiment, the user input may correspond to actions to be taken within an interactive scene rendering on a television.

To assist in receiving and interpreting the user input provided at the remote control that is paired to the television, the processor 201 of the television includes a plurality of modules. In one embodiment, some of the plurality of modules include a tree generator module 202, a first level selection option extractor module (or simply a first option extractor) 204, a first level visual mapper 206, a user input processor 208, a second option extractor 210 and a second level visual mapper 212. It should be appreciated that the aforementioned modules are exemplary and that other modules may also be used to process the input received from the physical remote control.

In one embodiment, the tree generator module 202 identifies the sets of keys on the physical remote control that may be used to provide user input and associate symbols/characters for each key. In one embodiment, two sets of keys are identified for providing user input. It should be appreciated that the sets of keys used for providing user input are, in turn, used to define symbols/characters in sequential order that are much easier to master and manage. The tree generator module 202 generates a two-level tree data structure with a plurality of nodes at the first level and the second level. In one embodiment, the second level nodes are referred to as leaf nodes and the height of the tree data structure is equal to one (i.e., having one edge between the node and the corresponding leaf node). The number of nodes defined in the first level of the ordered tree data structure corresponds to the number of first set of keys identified on the remote control. Similarly, the number of leaf nodes in the second level corresponds to the number of second set of keys identified on the remote control. Each node of the generated tree data structure is associated with a sub-set of symbols/characters used for providing input and each leaf node of the generated tree data structure is associated with a symbol/character from the sub-set of a particular node.

In one embodiment, the number pad with number buttons 0 to 9 is identified to be the first set of keys used to associate a sub-set of symbols from a first level of the tree structure and color-coded buttons are used to associate a particular symbol from the sub-set of symbols from the second level. In this embodiment, the number buttons (10 in number) in combination with the color-coded buttons (4 in number) define about 40 characters/symbols for user selection. It should be appreciated that the number of buttons in the first level and/or the second level may be varied in order to define greater or lesser number of character/symbols for user selection. Accordingly, in one embodiment, in addition to the 4 color-coded buttons, additional buttons may be used to allow selection of additional characters/symbols. For example, in addition to the red, blue, green and yellow color-coded buttons that are available on the remote control, a grey/black/silver button that is adjacent to or in the vicinity of the color-coded buttons may also be used to select additional symbols/characters. Consequently, with the addition of one more button to the second level, a total of 50 characters/symbols may be made available for selection. Along similar lines, in one embodiment, fewer buttons may be used to define and/or select characters/symbols. In this embodiment, instead of using all four color-coded buttons, only 3 color-coded buttons may be used to define/select the symbols/characters from a sub-set. Thus, the number of buttons used in the first level and/or the second level is exemplary and additional one or more buttons may be used to precisely select a symbol/character. For example, in addition to the 10 number buttons, additional buttons on either side of number zero in FIG. 1 may also be used for defining and selecting characters/symbols.

The first option extractor module 204 may interact with the tree generator to determine the number of buttons used to define characters/symbols at the first level and the corresponding mapping information. The button/mapping information is extracted by the first option extractor module 204 and shared with the first level visual mapper 206. The first level visual mapper 206 uses the information shared by the first option extractor module 204 to generate a visual representation of the mapping that provides a spatial relationship between the selection options available for a user at the first level and the first group of options available on the physical remote control. The spatial relationship information is presented on a display screen of the television to familiarize a user with the mapping so that the user may provide informed user input using the physical buttons of the remote control. In one embodiment, the visual representation includes appropriate graphics for identifying the characters/symbols available for user selection. In one embodiment, the symbols/characters associated with each key may depend on the type of application for which user input is sought. Accordingly, the graphics of the symbols/characters that are included in the visual representation dynamically change in accordance to the type of application for which the user input is being sought and received. For example, a first application may be a multimedia content viewing application and the graphics of the symbols/characters associated with each key may represent alphanumeric characters to enable search and selection of the multimedia content. When a user selects a second application, such as a gaming application, for viewing/interacting, the symbols/characters associated with the sets of keys/buttons are associated with the second application (i.e., gaming application). In accordance to the user's selection of the second application, the symbols/characters associated with each key and the corresponding graphics provided in the visual representation may be dynamically adjusted to correspond to the gaming application inputs.

The user input processor 208 detects the user selection at the physical remote control, in response to the visual representation presented on the display screen, and processes the information to identify the particular one of the selection options (i.e., a number button on the number pad when the first level is associated with the button options on the number pad) selected by the user. This information is shared with the second level option extractor 210. In one embodiment, the user selection information is used to filter out a majority of the selections. For example, in the case where ten numbers (i.e., buttons corresponding to numbers 0-9) of a number pad are used for selecting options from the first level, a user selection of a number button results in eliminating over 90 percent of the selections. When 12 buttons of the number pad are used (i.e., buttons corresponding to numbers 0-9 and the two buttons that are on either side of number 0 button on the number pad) in the first level, about 92 percent of the selections may be eliminated by a single button press on the number pad.

The second level option extractor 210 interacts with the tree generator 202 to obtain the symbols/characters that are mapped to the selected option from the first level that the user input processor 208 shared with the second level option extractor 210. The information that is extracted from the tree generator 202 includes a sub-set of the symbols/characters that are available for user selection. In the case where the selection options include the number pad and the color-coded buttons of the physical remote control, each number in the number pad may be associated with 4 symbols/characters and each of the 4 color-coded buttons may be used to select one of the 4 symbols/characters. As a result, the information that is extracted from the tree generator 202 includes information related to the 4 symbols/characters associated with the selected option of the first level. For example, number 1 button on the number pad may be associated with characters A, B, C and the number 1; number 2 button may be associated with characters D, E, F and the number 2; number 3 button may be associated with characters G, H, I and the number 3; and so on. When the first user input is received, the user input processor 208 may detect that the user has selected number 1 button. Consequently, the second level option extractor 210 queries the tree generator 202 to obtain the symbols/characters that are associated with number 1 button (i.e., the characters A, B, C and the number 1). This information is shared with the second level visual mapper 212.

The second level visual mapper 212 uses the information and the number of selection options that are available for the second level and generates a visual representation of the selection options as they are mapped to the color coded buttons. This visual map is provided to the display screen of the television to allow the user to select one of the available symbol/character options that are mapped to the selection options.

A second user input directed toward the available sub-set of symbol/character options is received by the user input processor 208. The second user input may be in the form of a specific color button press, for example. The user input is processed to identify specific one of the symbols/characters selected by the user. The embodiments described define how a character/symbol can be selected with just two user inputs, with the first user input provided using the first set of buttons/selection options available for the first level and the second user input provided using the second set of buttons/selection options available for the second level.

Figure 3:
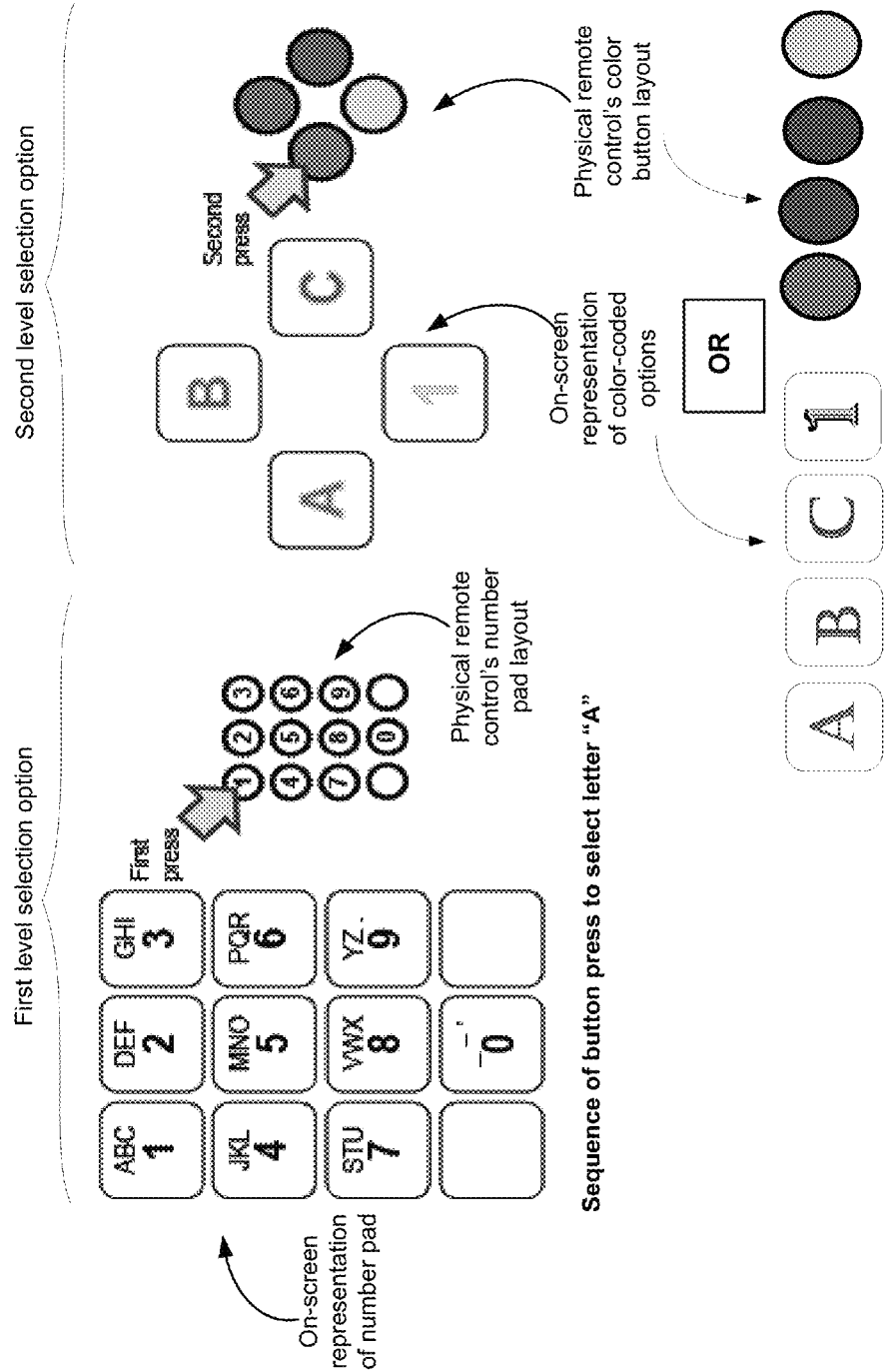
FIG. 3 illustrates a visual linkage to physical buttons provided in the visual representation presented on a display screen of a television, in one embodiment of the invention.

FIG. 3 illustrates visual maps of the selection options available at the first level and the second level as well as the sets of buttons of the physical remote control that are mapped to the corresponding selection options. A first visual map generated by the first level visual mapper module (of FIG. 2) identifies the spatial relationship between the selection options available at the first level and the first set of physical buttons (i.e., buttons from the number pad) of the remote control, and a second visual map generated by the second level visual mapper module (of FIG. 2) identifies the spatial relationship between the selection options available at the second level and the second set of physical buttons (i.e., color-coded buttons) of the remote control. The on-screen visual map generated mimics the layout of the buttons on the physical remote control. It should be appreciated that the selection options may be in the form of buttons, keys, or any other form of input indicators. As the television is paired to the remote control used to provide user inputs at the selection options, the television is aware of the layout of the keys/buttons/input indicators of the physical remote control. In the embodiment illustrated in FIG. 3, a first key press is provided at the number pad and the second key press is provided at the color-coded button layout. The layout of the first set of buttons and the second set of color-coded buttons is exemplary. In one embodiment, the color-coded buttons are laid out in a rhombus shape with each vertex of the rhombus mapping to a colored button and a symbol, and the visual map mimics the rhombus shape. In an alternate embodiment illustrated at the bottom portion of FIG. 3, the color-coded buttons may be laid out differently, such as in a straight line, and the visual map provided by the second level visual mapper module mimics the straight line layout. User input at each of the levels is captured and interpreted to identify the character/symbol.

Figure 3A:
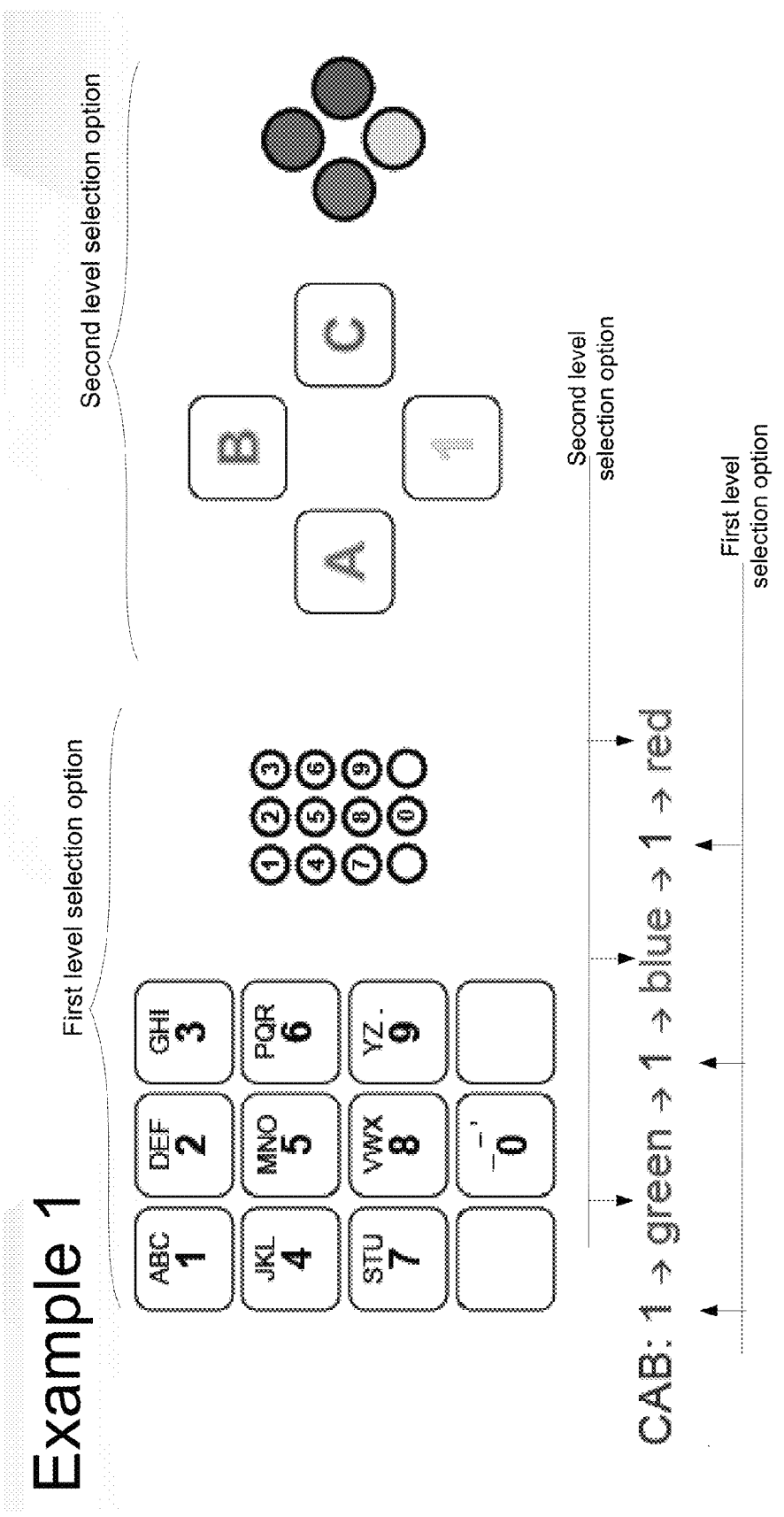
FIGS. 3A and 3B illustrate exemplary user input used to select textual characters, in one embodiment of the invention.
Figure 3B:
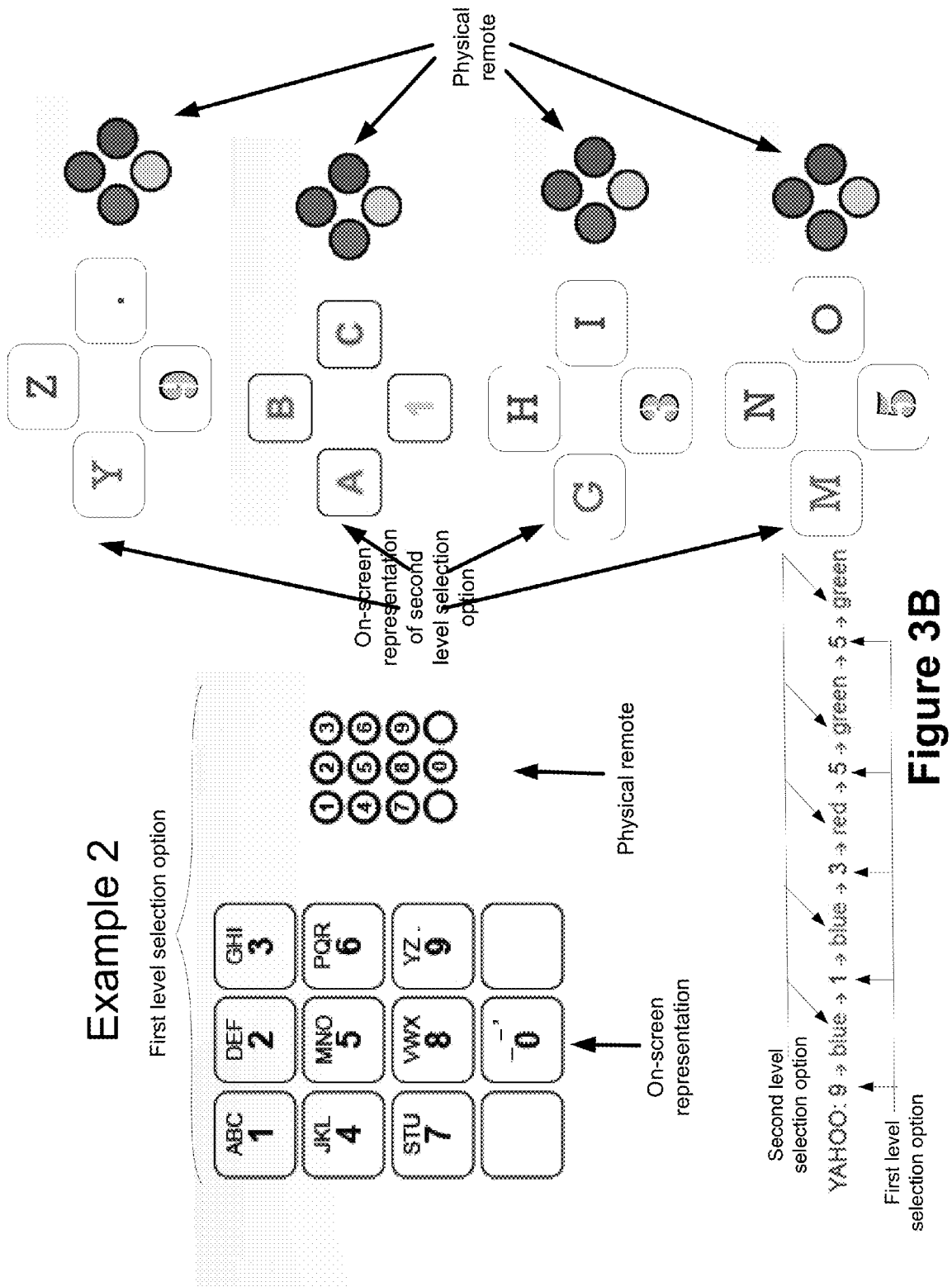

FIGS. 3A and 3B illustrate examples of user input using selection options provided at different levels to specify textual input. The on-screen map rendered on a display screen map the symbols/characters in the same way numbered buttons are laid out on the physical remote control. For example, numbers are distributed in 4 rows with each row having 3 numbers. Each number maps to a group of alphanumeric characters and the number itself. Thus, the rows in this example may be mapped as follows:

Row 1: 1 (ABC), 2 (DEF), 3 (GHI)
Row 2: 4 (JKL), 5 (MNO), 6 (PQR)
Row 3: 7 (STU), 8 (VWX), 9 YZ period)
Row 4: 0 (space hyphen apostrophe at)

Upon accessing a specific group, the 4 choices are rendered in a rhombus layout or any other layout, with each vertex/corner/intersection mapping to a colored button and a symbol. For example, first pressing number 1 will bring up a diamond of 4 choices in 3 rows:

B (red)
A (blue), C (green)
1 (yellow)

In the example illustrated in FIG. 3A, the textual input is provided with a user selection sequence that encompasses the selection options from the two levels. The first button selection relates to the first level and the second button selection relates to the second level. For example, for providing textual input of "CAB" the following selection sequence is provided: 1, green; 1, blue; and 1, red. Each letter character, as can be seen, are selected using just two button presses. There is no need to pause after each character/symbol selection.

FIG. 3B illustrates the selection sequence for providing a textual input that is different from the example illustrated in FIG. 3A. In this example, the textual input of "YAHOO" is provided with the following user selections using the selection options provided from the two levels: 9, blue color; 1, blue color; 3, red; 5, green; and 5, green. As mentioned, the on-screen map provided for the selection options at the first level and at the second level mimic the layout provided at the physical remote control that is associated with the television. As such, the rhombus shape is just one exemplary distribution option available on the physical remote and that other distribution options may also be available. The textual input and other user input are used for searching and selecting content or for providing interaction. In one embodiment, the user input may be directed toward selecting a game tool for interacting with a game and the selection options that are provided at the first and the second levels are directed toward the different game tools/options for selecting and interacting with the game.

As can be seen, the various embodiments provide an efficient way of entering textual and/or symbol/character inputs using standard keys/buttons/input options that are available on a physical remote control. Each character/symbol can be entered with just two key/button/input option selections making this a simple yet versatile input tool for providing user selection inputs. Users already know how to interact using the buttons/keys/input options provided in the remote control and so do not need an extended learning curve to familiarize with how to input selection options. Further, the visual maps help the users to learn the layout and the selection sequence to quickly enable them to become expert users for inputting the symbols/characters. The traditional mode of operation using directional arrows and select button on the remote control continues to be supported in the "casual" mode of operation while the number and color-coded buttons are used to support the "expert" mode of operation. Operation mode switching is supported allowing a user to change from casual mode to expert mode and vice versa and such switching can be effectuated immediately by engaging the different sets of buttons. Both modes co-exist and complement each other. Thus, the various embodiments described herein use the common buttons and the visual map to create a unified input flow.

Figure 4:
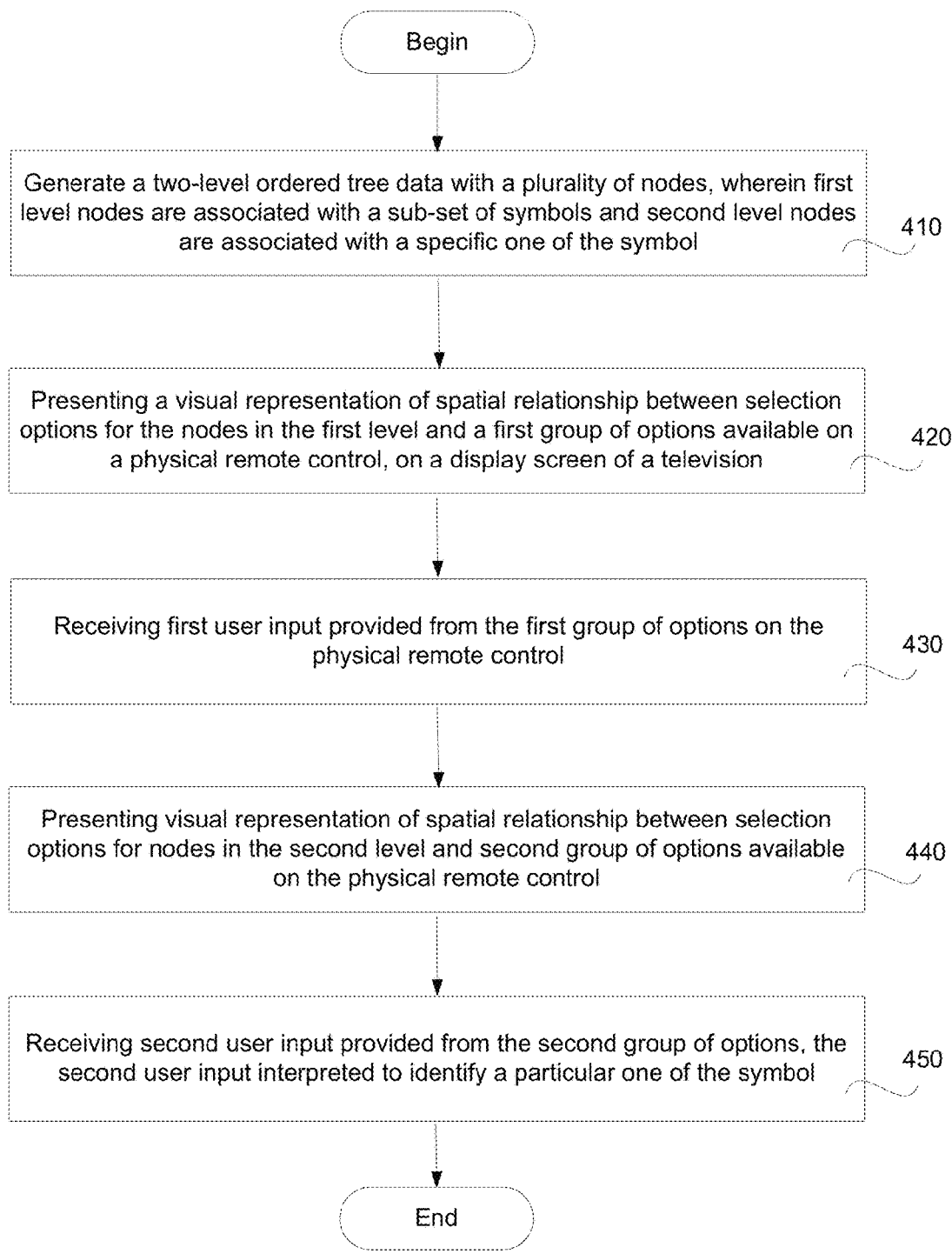
FIG. 4 illustrates a flow chart of process operations used in providing a character symbol using a physical remote control, in one embodiment of the invention.

FIG. 4 illustrates a flow chart of process operations for allowing a user to provide input to a television using an existing physical remote control, in one embodiment of the invention. The process begins with operation 410 wherein a two-level ordered tree data structure is generated. The tree structure is used for receiving user input. The tree structure includes a plurality of nodes defined at a first level and at a second level. The nodes at the second level are leaf nodes. Each node at the first level is associated with a sub-set of symbols/characters defined for user selection and each leaf node at the second level that corresponds with a node at the first level, is associated with a symbol/character from the sub-set.

A first set of selection options corresponding to the nodes from the first level of the ordered tree data structure is presented on a display screen of a television, as illustrated in operation 420. The presentation provides a visual representation of spatial relationship between the first level selection options and a first group of options available on a physical remote control that is associated with the television.

A first user input is received for the first set of selection options, as illustrated in operation 430. The first user input is provided using the first group of options on the physical remote control and is used to identify selection of a particular one of the selection options from the first level. The particular selection option is associated with a sub-set of symbols from the first level.

In response to receiving the first user input, a second set of selection options is presented, as illustrated in operation 440. The second set of selection options correspond to the plurality of leaf nodes from the second level that are associated with the particular selection option selected at the first level. The presentation provides a visual representation of the spatial relationship between the second level selection options and a second group of options available on the physical remote control. The second group of options identifies a set of buttons that are different from the set of buttons that correspond to the first group of options.

A second user input is received for the selection options presented from the second level, as illustrated in operation 450. The second user input is provided using the second group of options. The second user input is interpreted to identify a particular one of the symbols from the sub-set of symbols identified from the first level.

Figure 5:
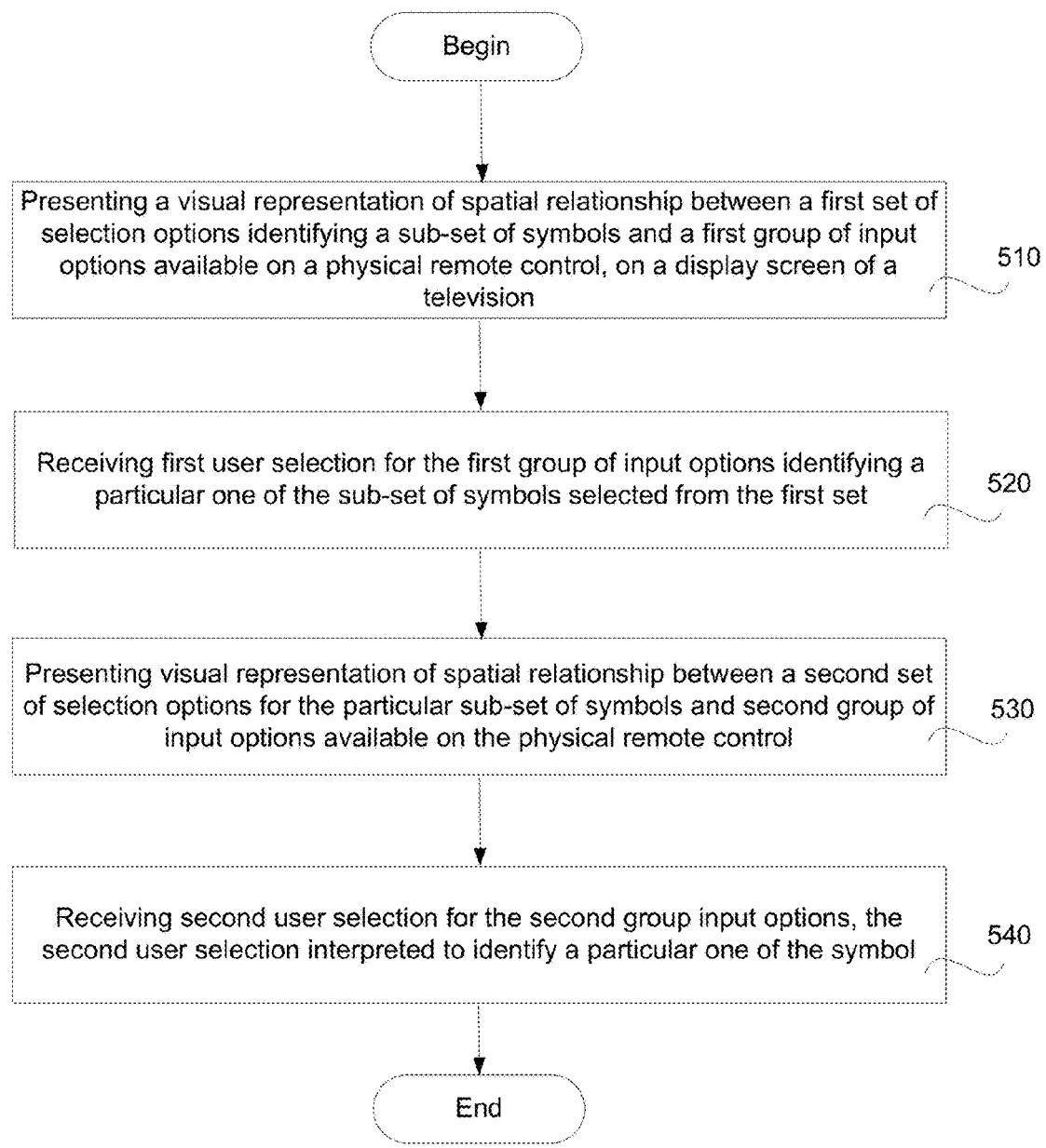
FIG. 5 illustrates a flow chart of process operations used in providing a character symbol using a physical remote control, in an alternate embodiment of the invention.

FIG. 5 illustrates a flow chart of process operations for allowing a user to provide input on a television using an existing physical remote control, in one embodiment of the invention. The process begins with a first set of selection options being presented on a display screen of a television, as illustrated in operation 510. Each of the first set of selection options identifies a sub-set of symbols. The selection options are presented in the form of a visual representation that provides a spatial relationship between the first set of selection options and a fist group of input options that are available on a physical remote control that is associated with the television. The input options may be in the form of set of keys, buttons or other input indicators that are provided on the remote control.

In response to the presentation of the visual representation, a first user selection is received for the first group of input options, as illustrated in operation 520. The first user selection may be in the form of a button or key press or by way of selection of the appropriate input indicator. The first user selection identifies a particular one of the sub-set of symbols selected from the first set of selection options. In response to the first user selection, a second set of selection options are presented on the display screen, as illustrated in operation 530. The second set of selection options correspond to the particular one of the sub-set of symbols selected from the first set. The presentation provides a visual representation of the spatial relationship between the second set of selection options related to the sub-set of symbols and a second group of input options available on the remote control. The first group of input options is related a first set of buttons/keys on the remote control and the second group of input options is related to a second set of buttons/keys on the remote control, with the first set of buttons/keys being different from the second set of buttons/keys.

A second user selection is received for the input options presented from the second group, as illustrated in operation 540. The second user selection is interpreted to identify a specific one of the symbol from the particular sub-set identified and presented in the visual representation.

The various embodiments described herein provide a way to enter each textual character, a symbol, a alphanumeric character or any other character on a television by mapping the characters/symbols to two sets of buttons/keys/input indicators (number pad and color-coded buttons) that are commonly available on most physical remote controls and using a two-step sequence to select the characters/symbols. As the user is already familiar with the button layout of the physical remote control there is no extended learning curve needed to learn the sequence. The user selection is more precise than when relying on predictive text which may suggest entries that may be incorrect or of poor quality. There is no need for maintaining dictionary of words, thereby conserving processing and memory resources. The current embodiments allow maintaining two modes of operation with the traditional casual and slower mode of operation being accessed through the navigational arrow buttons and select button on the remote control and the current expert and faster mode of operation using the number pad and the color-coded buttons. The spatial relationship visual map provided on the display screen are adaptable to different button/key layouts of a physical remote control that is associated with a television making this a more robust and easily adaptable solution. As different remote controls from different manufacturers have varying design layout of the buttons/keys, the visual map helps a user to quickly learn the input options available on the remote control to allow them to input the characters in a more precise manner.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
generating a two-level, ordered tree data structure for receiving user input, a first level of the ordered tree data structure comprising a plurality of nodes and a second level of the ordered tree data structure comprising a plurality of leaves for each node in the first level of the ordered tree data structure, wherein each one of the plurality of nodes is associated with a sub-set of symbols available for user selection, and each leaf of a particular one of the plurality of nodes corresponds to a symbol within the sub-set;
generating for presentation on a display screen of a television a first set of selection options corresponding to the plurality of nodes from the first level of the ordered tree data structure, the presentation includes a visual representation of spatial relationship between the first set of selection options and a first group of options available on a physical remote control;
receiving first user input identifying selection of a particular one of the selection options from the first set, wherein the first user input is provided using the first group of options on the physical remote control, the particular one of the selection option identifying the associated sub-set of the symbols;
generating for presentation a second set of selection options corresponding to the plurality of leaves from the second level of the ordered tree data structure, in response to receiving the first user input, the selection options from the second set corresponding to the particular selection option chosen from the first set, the presentation includes a visual representation of the spatial relationship between the second set of selection options and a second group of options available on the physical remote control, wherein the second group of options is different from the first group of options; and
receiving second user input for the selection options presented from the second set, the second user input is provided using the second group of options, the second user input interpreted to identify a particular one of the symbols from the sub-set.

2. The method of claim 1, wherein the first group of options is a number pad available on the physical remote control.

3. The method of claim 1, wherein the second group of options is a set of color-coded buttons available on the physical remote control.

4. The method of claim 1, wherein the first group of options and the second group of options are together used to identify an alphanumeric character.

5. The method of claim 1, wherein each symbol in the sub-set is related to an action to be taken within an interactive application currently rendering on the display screen of the television, the first group of options and the second group of options together are used to identify a specific action to be taken.

6. The method of claim 1, further includes providing appropriate graphics representing the first and the second set of selection options within the visual representation.

7. The method of claim 1, further includes receiving user input selection provided through a set of directional buttons of the physical remote control and interpreting the user input selection to identify a specific one of the symbol.

8. A method, comprising:
generating for presentation on a display screen of a television a first set of selection options, each one of the first set of selection options identifying a sub-set of symbols, the presentation providing a visual representation of spatial relationship between the first set of selection options and a first group of input options available on a physical remote control;
receiving a first user selection for the input options presented from the first group, the first user selection identifying a particular one of the sub-set of symbols selected from the first set of selection options;
generating for presentation a second set of selection options corresponding to the particular sub-set of symbols selected from the first set of selection options, in response to receiving the first user selection, the presentation providing a visual representation of spatial relationship between the second set of selection options related to the particular one of the sub-set of symbols and a second group of input options available on the physical remote control, wherein the second group of input options being different from the first group of input options; and
receiving a second user selection for the input options presented from the second group, the second user selection interpreted to identify a select one of the symbols from the sub-set of symbols.

9. The method of claim 8, wherein the visual representation of the first set of selection options and the second set of selection options include appropriate graphics that is representative of each of the first and the second set of selection options available on the physical remote control.

10. The method of claim 8, wherein the first group and the second group of input options together are used to identify alphanumeric characters, and wherein the visual representation of the first and the second sets of selection options correspond to graphics representing the respective alphanumeric characters.

11. The method of claim 8, wherein the first group and the second group of input options together are used to identify actions to be taken in an interactive application currently rendering on the display screen of the television and wherein the visual representation of the first and the second sets of selection options correspond to graphics that are representative of the respective actions.

12. The method of claim 8, further includes,
generating a two-level ordered tree data structure, wherein a first level of the ordered tree data structure comprises a plurality of nodes corresponding to the first set of selection options and a second level of the ordered tree data structure comprises a plurality of leaves for each of the plurality of nodes, the plurality of leaves corresponding to the second set of selection options, wherein each of the second set of selection options corresponds to a symbol within the sub-set of symbols.

13. The method of claim 8, wherein the first group of input options correspond to a number pad available on the physical remote control and the second group of input options correspond to color-coded buttons available on the physical remote control.

14. A television system, comprising:
   a remote control paired to a television;
   a processor within the television, the processor having circuitry for executing an application, wherein the application includes,
      a tree generator module to generate a two-level ordered tree data structure for receiving user input, a first level and a second level of the two-level ordered tree data structure comprising a plurality of nodes, each node in the first level associated with a sub-set of symbols and each node in the second level associated with a particular symbol within the sub-set of symbols of a corresponding node in the first level;
      a selection option extractor module to extract first level selection options, second level selection options and corresponding symbols mapped to the nodes in the first level and the second level, respectively;
      a first level visual mapper module to generate a visual representation of a spatial relationship between the first level selection options corresponding to the nodes in the first level and a first group of options available on the remote control associated with the television, wherein the visual representation identifies associated sub-set of symbols for each of the nodes in the first level that are mapped to corresponding one of the first group of options;
      a second level visual mapper module to generate the visual representation of the spatial relationship between the second level selection options corresponding to the nodes in the second level and a second group of options available on the remote control, wherein the visual representation identifies a sub-set of symbols associated with a node selected from the first level that is mapped to each one of the second group of options;
      a user input processor to present the appropriate visual representation from the first level selection options, the second level selection options for user selection, and to receive and interpret the user selection from the first group of options and the second group of options to identify a specific symbol selected by user input at the remote control; and
   a display screen for presenting the visual representations generated for the first level selection options and the second level selection options, for user selection and for detecting the user selection provided using the first group of options and the second group of options.

15. The television system of claim 14, wherein the first group of options and the second group of options are together used to identify an alphanumeric character.

16. The television system of claim 14, wherein the visual representation for the first level selection options and the second level selection options provide appropriate graphics that is representative of the first selection option and the second selection option available.

17. The television system of claim 14, wherein each symbol is related to an action to be taken within an interactive application currently rendering on the display screen of the television, the first group of options and the second group of options together are used to identify a specific action to be taken.

18. The television system of claim 17, wherein the visual representation of the first and the second sets of selection options provide graphics that are representative of the respective actions.

\* \* \* \* \*